May 31, 1960 E. H. WALLACE ET AL 2,938,560
TREAD CONSTRUCTION AND MOLD
Filed Dec. 31, 1958 3 Sheets-Sheet 1

INVENTOR.
EDWARD H. WALLACE
BY JAMES M. LANE
RUSSELL W. VANCE

Irwin M. Lewis
ATTORNEY.

May 31, 1960 E. H. WALLACE ET AL 2,938,560
TREAD CONSTRUCTION AND MOLD
Filed Dec. 31, 1958 3 Sheets-Sheet 2

INVENTOR.
EDWARD H. WALLACE
BY JAMES M. LANE
RUSSELL W. VANCE

ATTORNEY.

INVENTOR.
EDWARD H. WALLACE
BY JAMES M. LANE
RUSSELL W. VANCE
ATTORNEY.

United States Patent Office 2,938,560
Patented May 31, 1960

2,938,560

TREAD CONSTRUCTION AND MOLD

Edward H. Wallace, Grosse Pointe, James M. Lane, St. Clair Shores, and Russell W. Vance, Grosse Pointe, Mich., assignors to United States Rubber Company, New York, N.Y., a corporation of New Jersey Filed Dec. 31, 1958, Ser. No. 784,260

4 Claims. (Cl. 152—209)

This invention relates to an improved tread construction for a pneumatic vehicle tire and to a mold for making such a tread construction.

In accordance with the invention, a major portion of the rubber tread surface has a pattern of circumferentially extending, undulating slots formed therein with the respective concaved and convexed portions of adjacent slots directly opposed and the opposed convexed portions of adjacent slots tangent whereby a plurality of small flexible tread elements having generally pointed front and back edges are formed between the points of tangency of the adjacent slots. Laterally adjacent tread elements are provided with sub-surface support in the form of sub-surface connecting ribs extending diagonally from the sides of the elements to permit the slots to be quite deep without danger of the tread elements being torn from the tread during use.

It has been found that the small flexible tread elements provide excellent skid resistance and traction. This is due to the multitude of gripping edges resulting from the tilting of the small elements and the plowing action of the pointed front and rear edges of the elements which guide and direct the road film to the slots to provide a clean dry surface for effective traction and skid resistance. Test of tires incorporating the tread construction of the invention have shown improvements of 30% in skid resistance, 57% better break-away traction, and 32% better sideway skid resistance than conventional tires.

The mold for forming the tread includes circumferentially extending undulating inserts for forming the undulating slots. Respective concave and convex portions of adjacent inserts are directly opposed and opposed convex portions of adjacent inserts are tangent without being connected. This lack of connection between the adjacent inserts at the points of tangency permits air to vent circumferentially around the mold during curing of the tire so that no vents through the mold are required for the individual units. In absence of this feature a vent would have to be provided through the mold for each small tread element of which there may be thousands in a single tread. While the lack of connection between the mold inserts permits the formation of small films of tread rubber connecting the small tread elements, these films break either when the tire is removed from the mold or shortly upon use of a tire so that the small elements are completely separate and unattached, except for sub-surface interconnection.

The invention and its advantages having been broadly described, a more detailed description is given hereafter by reference to the accompanying drawings wherein.

Figure 1:
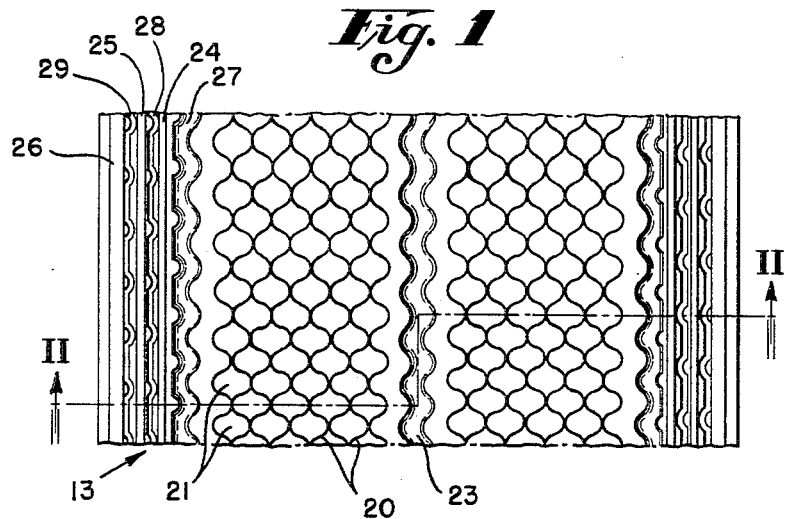
Fig. 1 is a plan view of a portion of a tire tread incorporating a tread construction in accordance with the invention.
Figure 2:
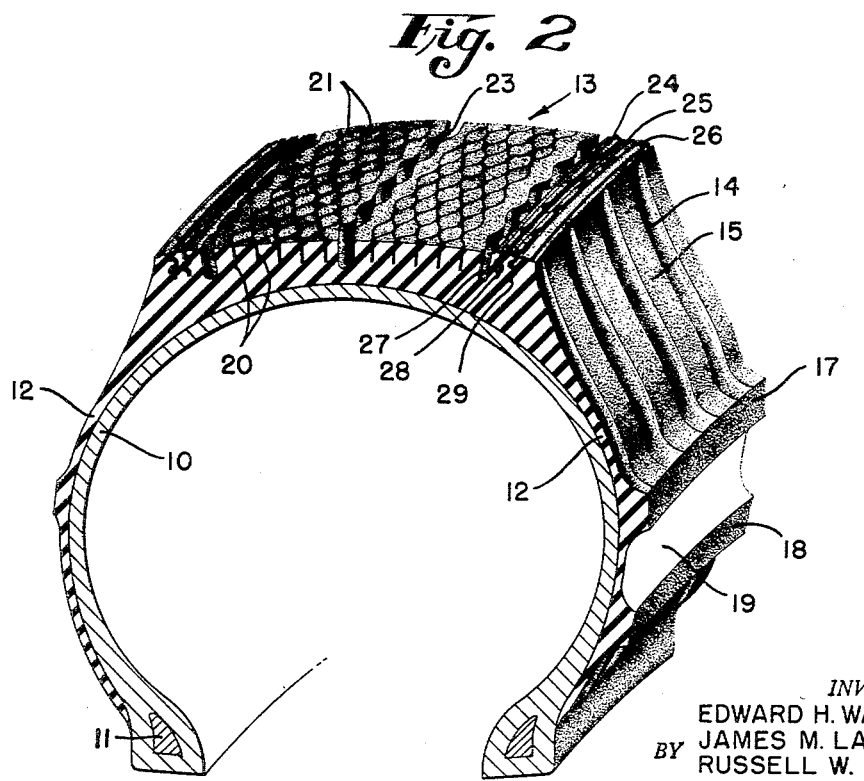
Fig. 2 is a sectional, isometric view taken on line II—II of Fig. 1.

Referring to the drawings and in particular to Figs. 1 and 2, the tread construction of the invention is shown applied to the tread 13 of a pneumatic tire comprising the usual carcass 10 having inextensible bead elements 11 and sidewalls 12. The sidewalls 12 may be optionally provided with ornamentations such as the alternate grooves and ribs 14 and 15 and circumferentially extending sidewall protective ribs 17, 18 having a white or colored rubber strip 19 therebetween.

Figure 3:
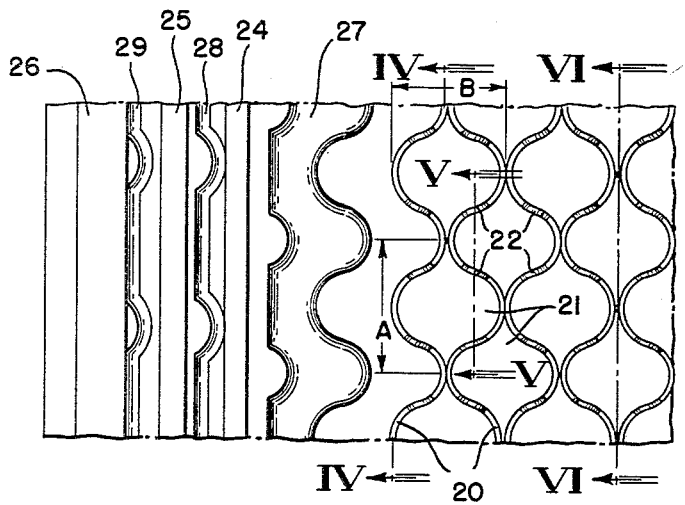
Fig. 3 is an enlarged view of a portion of the tread.
Figure 5:
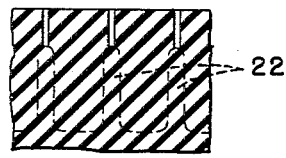
Fig. 5 is a sectional view taken on line V—V of Fig. 3.
Figure 4:
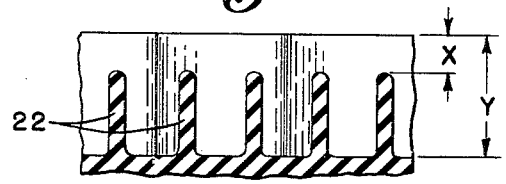
Fig. 4 is a sectional view taken on line IV—IV of Fig. 3.

In accordance with the invention, a major portion of the tread 13 has a pattern of circumferentially extending, undulating slots 20 formed therein with the respective concaved and convexed portions of adjacent grooves directly opposed to one another and the opposed convexed portions of adjacent slots tangent, as best shown in Fig. 3, so as to form small flexible tread elements 21 having generally pointed front and back edges.

The distance A between the points of tangency and the maximum width B between the adjacent slots is made quite small so that the resulting tread elements or toes 21 are quite small. Good results are obtained if dimension A, as shown in Fig. 3, is held to between .500" and .250", and dimension B held to between .250" and .1875".

Preferably the slots 20 are made quite deep and each tread element 21 is provided with four point, subsurface, lateral support in the form of diagonally extending subsurface ribs or bars 22 connecting adjacent elements as best shown in Figs. 3, 4, 5, 6 and 9. The ribs or bars 22 prevent tearing out of the small tread elements 21 while permitting the slots 20 to be quite deep so as to provide greater flexibility to the elements 21. Best results are obtained if the unsupported height X of the elements is not greater than .145" and preferably for high speed driving (in excess of 85 miles per hour) not greater than .100". The height Y of the elements 21 between the ribs or bars 22 may be as much as .50" and preferably not less than .250".

Figure 9:
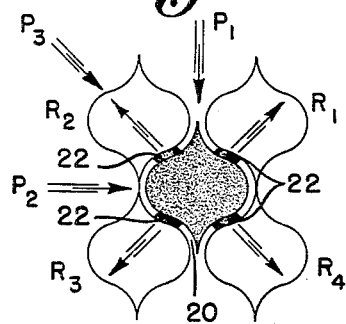
Fig. 9 is an enlarged view of a single tread element to show the various application of forces and the reacting resistant forces on the element.
Figure 6:
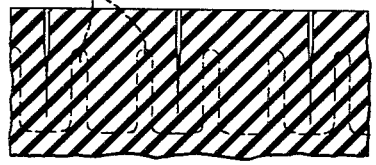
Fig. 6 is a sectional view taken on line VI—VI of Fig. 3.

The advantage of the four-point support provided by the sub-surface ribs or bars 22 is illustrated in Fig. 9. Referring to Fig. 9, if a force P1 is applied then the reacting forces are R1 and R2 plus some compressive forces absorbed by R3 and R4. A similar formula would apply to the force from P2. The forces of R1 and R2 react when the element enters contact and the forces R3 and R4 react when the element leaves contact. Any angular force, such as P3, would be equal to an angular increment of the reactive forces. Therefore, any active force P applied is reacted upon by a minimum of two reactive forces R.

Figure 7:
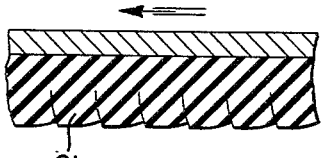
Fig. 7 is a fragmentary circumferential sectional view of a portion of the tire tread as it appears when the brake is applied.
Figure 8:
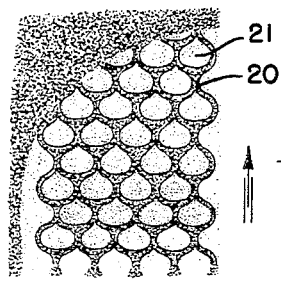
Fig. 8 is a view of a portion of the tread in contact with a road surface showing the elements as they appear when the brake is applied.

In Fig. 7 there is shown the tilting action of the small flexible elements 21 so that they present a multitude of gripping and wiping edges during a skid in the direction of the arrow. Fig. 8 shows the tire foot print resulting from a skid in the direction of the arrow and shows how the tread elements 21 act as plows or dividers for the road film in order to guide it along the slots 20.

Referring to Figs. 1 and 2, a longitudinal center groove 23 may be provided to give the tread 13 additional flexibility. Three rather narrow shoulder ribs 24, 25 and 26 formed by grooves 27, 28 and 29 adjacent each shoulder of the tire may also be provided. These flexible ribs 24, 25 and 26 help maintain uniform wear and prevent squealing and scuffing on turns.

Figure 10:
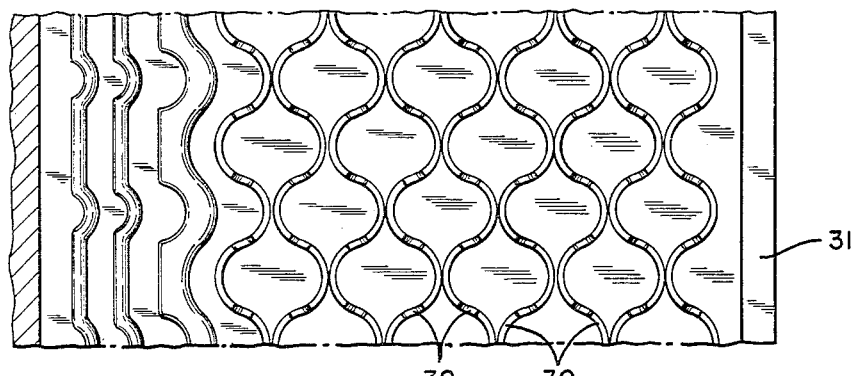
Fig. 10 is an enlarged plan view of a portion of a mold used in forming the tread design shown in Figs. 1 and 2.
Figure 11:
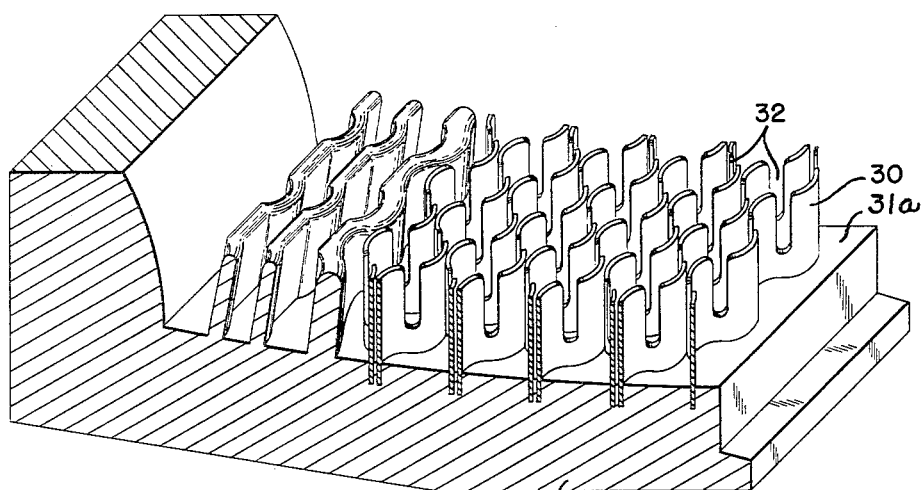
Fig. 11 is a perspective view of the mold shown in Fig. 10.
Figure 12:
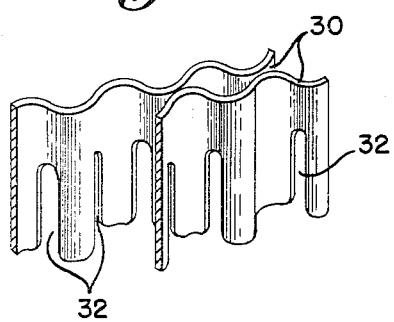
Fig. 12 is an enlaged fragmentary perspective view of the inserts used in the mold.

The pattern of slots 20 forming the small tread elements 21 may be formed by a mold as shown in Figs. 10 and 11. The slots 20 are formed by undulating, circumferentially extending rigid inserts 30 which are anchored in the tread forming surface 31a of the mold 31. The respective convex portions of adjacent inserts are substantially tangent and contact or have only a very slight clearance between them. The inserts are not connected together at the points of tangency. This allows air to vent circumferentially of the mold so that no vent passages need be provided for the individual spaces between points of tangency. If the inserts were secured together at their points of tangency air could not vent circumferentially and a vent passage through the mold wall would have to be provided for each space between points of tangency. While films of rubber interconnecting adjacent elements 21 may form because the adjacent inserts are not attached at their points of tangency, these films readily break upon removal of the tire from the mold or on initial use of the tire so that the elements 21 are unconnected and function independently. Slots 32 provided through the inserts 30 form the interconnecting and supporting ribs or bars 22 for the tread elements 21.

From the above description it can be seen that there is provided an improved tread construction and mold for forming the tread. While a specific embodiment of the invention is shown and described it will be appreciated that this is for the purpose of illustration only and that changes and modifications may be made therein without departing from the scope of the invention.

Having thus described our invention, what we claim and desire to protect by Letters Patent is:

1. A rubber tread for a pneumatic tire, a major portion of the outer tread surface of said tread having a pattern of circumferentially extending undulating slots formed therein with the respective concaved and convexed portions of adjacent slots directly opposed and with the opposed convexed portions tangent, and a plurality of essentially cylindrical, substantially individual, flexible rubber tread elements formed by said slots, each of said tread elements being provided with sub-surface lateral support in the form of diagonally extending sub-surface rubber bars extending between laterally adjacent elements, said tread elements providing a multitude of gripping edges, whereby the skid resistance and traction of said tire are improved.

2. A tread as defined in claim 1, in which said tread elements have generally pointed front and back edges formed at the points of tangency of said slots.

3. A tread as defined in claim 2, in which said tread elements extend above said bars to a height of between .100 inch and .145 inch and are of a height between said bars of between .250 inch and .500 inch.

4. A tread as defined in claim 3, in which the circumferential distance between said points of tangency is between .250 inch and .500 inch and the maximum width between adjacent slots is between .1875 inch and .250 inch.

References Cited in the file of this patent

UNITED STATES PATENTS

| | | |
|---|---|---|
| 588,724 | Bailey | Aug. 24, 1897 |
| 2,612,928 | Buddenhagen | Oct. 7, 1952 |
| 2,690,202 | Walsh | Sept. 28, 1954 |
| 2,759,220 | Hawkinson | Aug. 21, 1956 |
| 2,830,321 | Hawkinson | Apr. 15, 1958 |